United States Patent [19]

Leonardi

[11] Patent Number: 4,941,078
[45] Date of Patent: Jul. 10, 1990

[54] SYNCHRONIZED SWITCH-MODE POWER SUPPLY

[75] Inventor: Giovanni M. Leonardi, Giornico, Switzerland

[73] Assignee: RCA Licensing Corporation, Princeton, N.J.

[21] Appl. No.: 424,353

[22] Filed: Oct. 19, 1989

[30] Foreign Application Priority Data

Mar. 7, 1989 [GB] United Kingdom ............... 8905172
Mar. 7, 1989 [GB] United Kingdom ............... 8905173

[51] Int. Cl.$^5$ .......................................... H02M 3/335
[52] U.S. Cl. ........................................ 363/97; 363/19
[58] Field of Search .................... 363/18, 19, 20, 21, 363/49, 97, 131

[56] References Cited

U.S. PATENT DOCUMENTS

| | | | |
|---|---|---|---|
| 3,590,362 | 6/1971 | Kakalec | 321/18 |
| 3,818,314 | 6/1974 | Bishop et al. | 323/60 |
| 3,989,995 | 11/1976 | Peterson | 363/19 |
| 4,024,577 | 5/1977 | Diethelm | 358/190 |
| 4,073,003 | 2/1978 | Chambers | 363/20 |
| 4,135,233 | 1/1979 | Seiersen | 363/21 |
| 4,172,276 | 10/1979 | Kameya | 363/19 |
| 4,228,493 | 10/1980 | de Sartre et al. | 363/97 |
| 4,245,180 | 1/1981 | Rilly et al. | 358/190 |
| 4,272,805 | 6/1981 | Iguchi et al. | 363/19 |
| 4,327,404 | 4/1982 | Horiguchi | 363/19 |
| 4,453,206 | 6/1984 | Voight | 363/97 |
| 4,466,051 | 8/1984 | Fitzgerald | 363/21 |
| 4,481,564 | 11/1984 | Balaban | 363/21 |
| 4,499,530 | 2/1985 | Onda et al. | 363/21 |
| 4,524,411 | 6/1985 | Willis | 363/21 |
| 4,595,977 | 6/1986 | von der Ohe | 363/21 |
| 4,648,016 | 3/1987 | Peruth et al. | 363/21 |
| 4,649,464 | 3/1987 | Shono | 363/97 |
| 4,683,528 | 7/1987 | Snow et al. | 363/21 |
| 4,688,159 | 8/1987 | Marinus | 363/19 |
| 4,692,852 | 9/1987 | Hoover | 363/131 |
| 4,692,853 | 9/1987 | Sartre et al. | 363/49 |
| 4,694,385 | 9/1987 | Marinus | 363/18 |
| 4,766,528 | 8/1988 | Marinus . | |

OTHER PUBLICATIONS

A Schematic Diagram of a Power Supply Module AZB5000 of a Television Receiver Power Supply Publ. by Siemens Co., Jan. 1974.
A Data Sheet Dated Jan. 1986 for an Integrated Circuit, TEA2162, Publ. by Thomson Semiconductors, France.

Primary Examiner—William H. Beha, Jr.
Assistant Examiner—Jeffrey Sterrett
Attorney, Agent, or Firm—Joseph S. Tripoli; Joseph J. Laks; Sammy S. Henig

[57] ABSTRACT

In a switch mode power supply, a first switching transistor is coupled to a primary winding of an isolation transformer. A second switching transistor periodically applies a low impedance across a second winding of the transformer that is coupled to an oscillator for synchronizing the oscillator to the horizontal frequency. A third winding of the transformer is coupled via a switching diode to a capacitor of a control circuit for developing a DC control voltage in the capacitor that varies in accordance with a supply voltage B+. The control voltage is applied via the transformer to a pulse width modulator that is responsive to the oscillator output signal for producing a pulse-width modulated control signal. The control signal is applied to a mains coupled chopper transistor for generating and regulating the supply voltage B+ in accordance with the pulse width modulation of the control signal.

24 Claims, 5 Drawing Sheets

SYNCHRONIZED SWITCH-MODE POWER SUPPLY

The invention relates to switch-mode power supplies.

Some television receivers have signal terminals for receiving, for example, external video input signals such as R, G and B input signals, that are to be developed relative to the common conductor of the receiver. Such signal terminals and the receiver common conductor may be coupled to corresponding signal terminals and common conductors of external devices, such as, for example, a VCR or a teletext decoder.

To simplify the coupling of signals between the external devices and the television receiver, the common conductors of the receiver and of the external devices are connected together so that all are at the same potential. The signal lines of each external device are coupled to the corresponding signal terminals of the receiver. In such an arrangement, the common conductor of each device, such as of the television receiver, may be held "floating", or conductively isolated, relative to the corresponding AC mains supply source that energizes the device. When the common conductor is held floating, a user touching a terminal that is at the potential of the common conductor will not suffer an electrical shock.

Therefore, it may be desirable to isolate the common conductor, or ground, of, for example, the television receiver from the potentials of the terminals of the AC mains supply source that provide power to the television receiver. Such isolation is typically achieved by a transformer. The isolated common conductor is sometimes referred to as a "cold" ground conductor.

In a typical switch mode power supply (SMPS) of a television receiver the AC mains supply voltage is coupled, for example, directly, and without using transformer coupling, to a bridge rectifier. An unregulated direct current (DC) input supply voltage is produced that is, for example, referenced to a common conductor, referred to as "hot" ground, and that is conductively isolated from the cold ground conductor. A pulse width modulator controls the duty cycle of a chopper transistor switch that applies the unregulated supply voltage across a primary winding of an isolating flyback transformer. A flyback voltage at a frequency that is determined by the modulator is developed at a secondary winding of the transformer and is rectified to produce a DC output supply voltage such as a voltage B+ that energizes a horizontal deflection circuit of the television receiver. The primary winding of the flyback transformer is, for example, conductively coupled to the hot ground conductor. The secondary winding of the flyback transformer and voltage B+ may be conductively isolated from the hot ground conductor by the hot-cold barrier formed by the transformer.

It may be desirable to synchronize the operation of the chopper transistor to horizontal scanning frequency for preventing the occurrence of an objectionable visual pattern in an image displayed in a display of the television receiver.

It may be further desirable to couple a horizontal synchronizing signal that is referenced to the cold ground to the pulse-width modulator that is referenced to the hot ground such that isolation is maintained.

A synchronized switch mode power supply, embodying an aspect of the invention, includes a transformer having first and second windings. A first switching arrangement is coupled to the first winding for generating a first switching current in the first winding to periodically energize the second winding. A source of a synchronizing input signal at a frequency that is related to a deflection frequency is provided. A second switching arrangement responsive to the input signal and coupled to the second winding periodically applies a low impedance across the energized second winding that by transformer action produces a substantial increase in the first switching current. A periodic first control signal is generated. The increase in the first switching current is sensed to synchronize the first control signal to the input signal. An output supply voltage is generated from an input supply voltage in accordance with the first control signal.

FIG. 1 formed by FIGS. 1a and 1b illustrates a power supply embodying aspect of the invention;

FIG. 1 illustrates a switch-mode power supply (SMPS) 300, embodying an aspect of the invention. SMPS 300 produces an output supply voltage B+ at +145 volts that is used for energizing, for example, a deflection circuit of a television receiver, not shown, and an output supply voltage V+ for energizing a remote control receiver of the television receiver that are both regulated voltages.

Figure 1A:
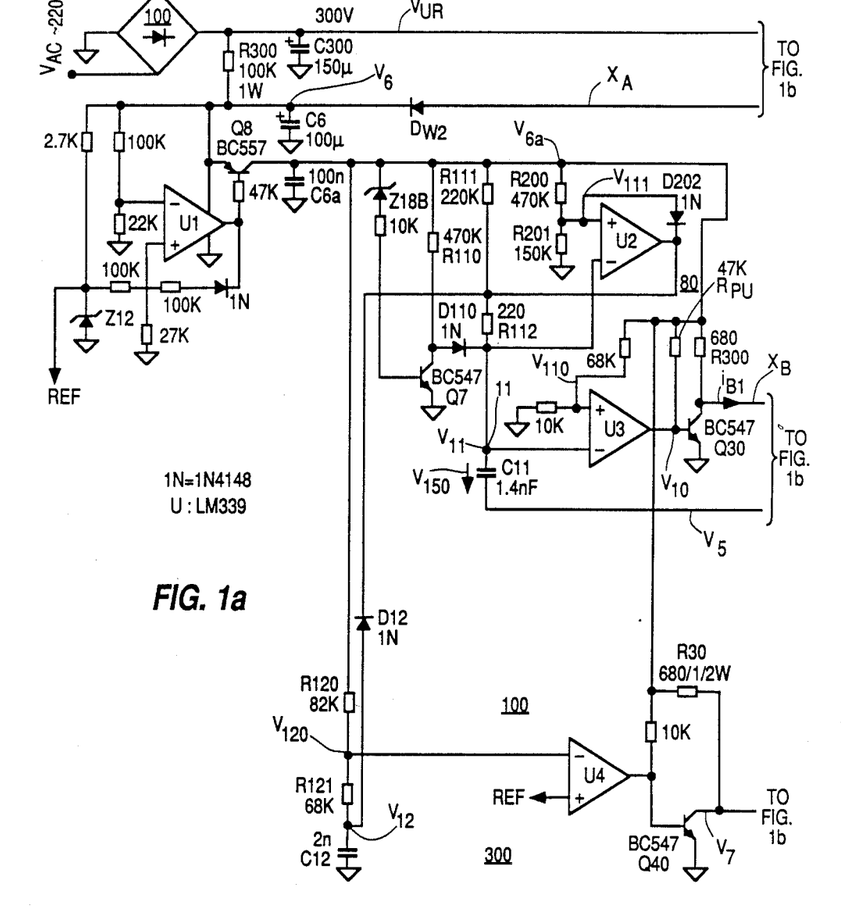
Figure 1B:
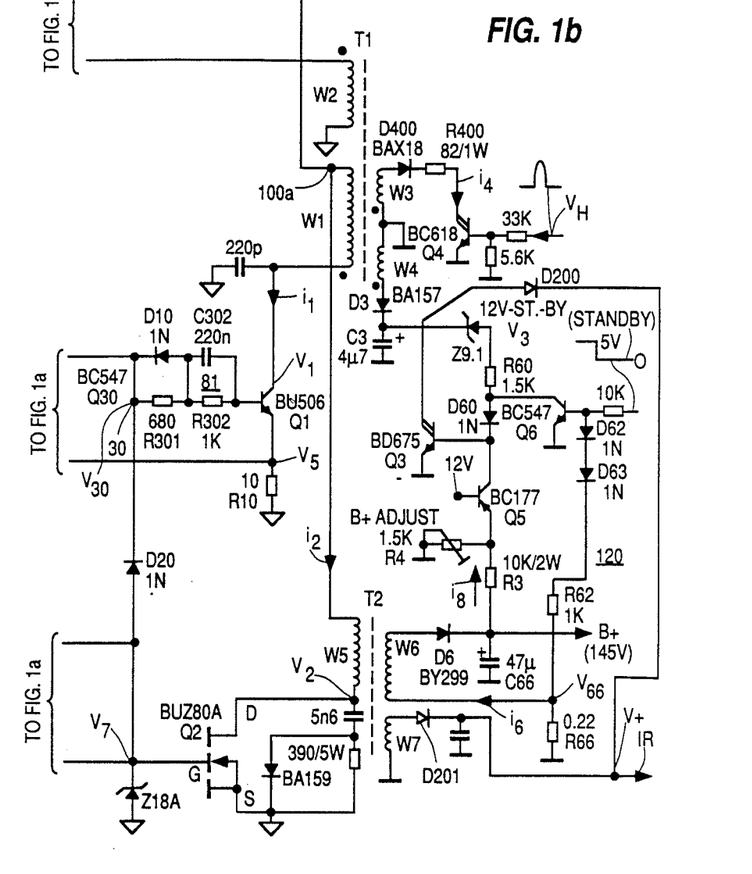

A mains supply voltage $V_{AC}$ is rectified in a bridge rectifier 100 to produce an unregulated voltage $V_{UR}$. A primary winding W5 of a chopper flyback transformer T2 is coupled between a terminal 100a and a drain electrode of a power, MOS transistor Q2 having a source electrode that is coupled to a common conductor, referred to herein as "hot" ground. Transistor Q2 is switched by a pulse-width modulated control signal or voltage $V_7$ that is produced by a pulse-width modulator 100.

A primary winding W1 of a flyback transformer T1 is coupled between terminal 100a, where voltage $V_{UR}$ is developed, and a collector electrode of a switching transistor Q1 that is included in pulse-width modulator 100. The emitter of transistor Q1 is coupled to the hot ground via an emitter current sampling resistor R10 for developing a voltage $V_5$ across resistor R10 that is proportional to a collector current $i_1$ of transistor Q1.

FIGS. 2a–2j illustrate waveforms useful for explaining the normal steady state operation of the SMPS of FIG. 1. Similar symbols and numerals in FIGS. 1 and 2a–2j indicate similar items or functions.

Figure 2:
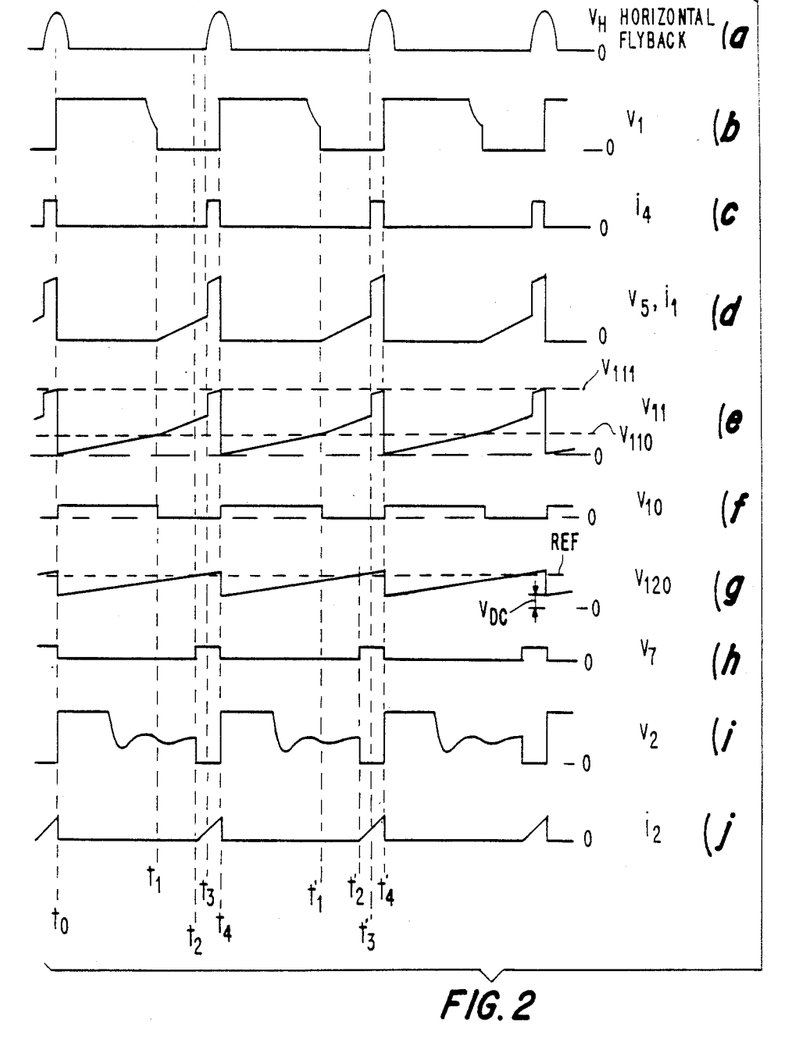
FIGS. 2a–2j illustrate waveforms useful for explaining the run mode operation of the circuit of FIG. 1 when loading is constant.

During an interval $t_1$–$t_4$ of FIG. 2f of a given cycle or period of the switching operation, a base voltage $V_{10}$ of a transistor Q30 of FIG. 1 is at zero volts, causing a positive pulse voltage $V_{30}$ to be developed at the collector of transistor Q30. Voltage $V_{30}$ is coupled via a network 81 to the base of transistor Q1, causing transistor Q1 to be turned on during interval $t_1$–$t_4$ of FIG. 2d. A diode D20 of FIG. 1 is coupled between the collector of transistor Q30 and the gate electrode of transistor Q2. Positive pulse voltage $V_{30}$ back biases diode D20.

During an interval $t_2$–$t_4$ of FIG. 2h, a transistor Q40 of FIG. 1 is nonconductive and, in conjunction with diode D20, enables a voltage $V_{6a}$ that is coupled via a resistor R30 to the gate electrode of transistor Q2 to produce a positive voltage $V_7$. Positive voltage $V_7$ causes transistor Q2 to be turned on during interval $t_2$–$t_4$ of FIG. 2j. Consequently, upramping switching currents $i_1$ and $i_2$ of corresponding FIGS. 2d and 2j flow in windings W1 and W2, respectively, of FIG. 1 and store inductive energy in transformers T1 and T2.

In accordance with an aspect of the invention, a switching transistor Q4 is coupled via diode D400 and a current limiting resistor R400 having a low resistance across a secondary winding W3 of transformer T1. While transistors Q1 and Q2 are conductive, transistor Q4 is turned on. Transistor Q4 is turned on by a flyback pulse $V_H$ at a horizontal rate $f_H$ that is derived from the deflection circuit. Pulse $V_H$ is coupled to the base of transistor Q4. Consequently, at time $t_3$ of FIG. 2d that occurs during the horizontal retrace interval of signal $V_H$ of FIG. 2a, transistor Q4 of FIG. 1 applies a low impedance across winding W3 that loads transformer T1 causing, by a transformer action, a step increase in collector current $i_1$ of transistor Q1 as a result of the transformer coupled low impedance.

Collector current $i_1$ in transistor Q1 develops a sense voltage $V_5$ of FIG. 2d across sampling resistor R10 of FIG. 1 that is coupled via capacitor C11 to form voltage $V_{11}$ at terminal 11. The step increase in current $i_1$ of FIG. 2c at time $t_3$ causes a step increase in a voltage $V_{11}$ of FIG. 2e at a terminal 11 of FIG. 1. After the step increase at time $t_3$, each current $i_1$ of FIG. 2c and voltage $V_{11}$ of FIG. 2e continues to increase in an upramping manner at a rate that is determined by the inductance of winding W1. Voltage $V_{11}$ is developed at an inverting input terminal of a comparator or amplifier U3. Amplifier U3 has an output terminal that is coupled to the base of transistor Q30 there for developing switching signal or voltage $V_{10}$.

Amplifier U3, transistor Q30, and transistor Q1 form an oscillator as a result of a positive feedback path via a capacitor C11 that is coupled between emitter current sampling resistor R1O of transistor Q1 and terminal 11. Terminal 11 is coupled to the inverting input terminal of comparator U3 and also to an inverting input terminal of an amplifier or comparator U2.

In accordance with a feature of the invention, signal $V_H$ that is coupled to such oscillator via the low impedance formed by transistor Q4 synchronizes the switching timings in SMPS 300 to the horizontal scanning frequency. Such synchronization is desirable for preventing an undesirable form of disturbance in the displayed image.

A voltage $V_{111}$ is coupled from voltage $V_{6a}$ via a voltage divider formed by resistors R200 and R201. A diode D202 is coupled in the forward direction from a noninverting input terminal of amplifier U2 where voltage $V_{111}$ is developed to an output terminal of amplifier U2. The output terminal of amplifier U2 is coupled via a relatively small resistor R112 to terminal 11 and also via a diode D12 to one plate of a capacitor C12. The other plate of capacitor C12 is coupled to the hot ground.

Time $t_4$ of FIG. 2d follows the gradual upramping increase in current $i_1$ between times $t_3$ and $t_4$ that, in turn, follows the aforementioned step increase rise at time $t_3$. At the time $t_4$, voltage $V_{11}$ of FIG. 2e becomes larger than voltage $V_{111}$. The result is that the voltage at the output terminal of amplifier U2 becomes zero relative to the hot ground. Therefore, voltage $V_{11}$ is clamped to zero volts by the output terminal amplifier U2 via resistor R112, thereby discharging capacitor C11 fast. Simultaneously, a sawtooth voltage $V_{12}$ across capacitor C12 that has been previously charged from voltage $V_{6a}$ via resistors R120 and R121 is clamped fast to zero volts via a diode D12. Diode D202 that becomes conductive causes voltage $V_{111}$ to be clamped to a substantially smaller value that provides a Schmitt trigger operation in amplifier U2.

A DC voltage $V_{110}$ is developed at a noninverting input terminal of comparator U3. Voltage $V_{110}$ is produced from voltage $V_{6a}$ via a resistive voltage divider. At time $t_0$ or $t_4$ of FIG. 2e, voltage $V_{111}$ becomes smaller than voltage $V_{110}$ as a result of the clamping operation via resistor 220 of FIG. 1. Therefore, output signal $V_{10}$ of FIG. 2f at the output terminal of comparator U3 of FIG. 1 increases as a result of coupling voltage $V_{6a}$ via a pull-up resistor $R_{PU}$. At time $t_4$ of FIG. 2f, signal $V_{10}$ that is coupled to the base of a driver switching transistor Q30 of FIG. 1 causes transistor Q30 to turn-on.

When transistor Q30 is turned on, it causes both transistors Q1 and Q2 to turn off. Consequently, the stored inductive energy in transformer T2 is transferred via a secondary winding W6 and via a diode D6 to a filter capacitor C66 in a flyback operation for producing output supply voltage B+. Similarly, voltage V+ is produced via a winding W7.

In the same manner, the energy stored in transformer T1 generates a flyback switching current in a secondary winding W4 of transformer T1 that turns on a diode D3 and that continues flowing in a capacitor C3. Thus, capacitor C3 is coupled across winding W4 via switching diode D3 after time $t_0$ of FIG. 2b. The result is that a DC control voltage $V_3$ of FIG. 1 is developed in capacitor C3. The magnitude of voltage $V_3$ is controllable, as described later on. Control voltage $V_3$ in capacitor C3 is coupled by the transformer action to a secondary winding W2 of transformer T2 and is rectified by a diode $D_{W2}$ for producing a control voltage $V_6$ in a filter capacitor C6.

During normal operation, a transistor Q8 operates as a conductive switch and couples voltage $V_6$ to a filter capacitor C6a to form control voltage $V_{6a}$ that is substantially equal to voltage $V_6$. The ratio of voltage $V_{6a}$ to voltage $V_3$ is determined by the turn ratio of windings W4 and W2.

After time $t_0$ or $t_4$ of FIG. 2e, when capacitor C11 of FIG. 1 has discharged, the output terminal of amplifier U2 of FIG. 1 forms a high impedance. Therefore, during, for example, interval $t_0$–$t_4$ of FIG. 2e, a current flowing in resistors R111 and R112 of FIG. 1 charges capacitor C11 and a current flowing in resistors R120 and R121 charges capacitor C12.

At time $t_0$, a voltage $V_{120}$ at a junction between resistors R120 and R121 is at a level $V_{DC}$ of FIG. 2g that is controlled by voltage $V_{6a}$ of FIG. 1. After time $t_0$, each of voltages $V_{11}$ and $V_{120}$ of FIGS. 2e and 2g, respectively, increase in an upramping manner at a rate of change that is determined by voltage $V_3$ in capacitor C3.

At time $t_1$ of FIG. 2e, voltage $V_{11}$ exceeds voltage $V_{110}$ that is developed at a noninverting input terminal of amplifier U3 of FIG. 1. Consequently, at time $t_1$ of FIG. 2e, transistor Q30 of FIG. 1 is turned off, causing transistor Q1 to be turned on, as explained before.

At a later time in the cycle, time $t_2$, of FIG. 2g, upramping voltage $V_{120}$ at an inverting input terminal of an amplifier U4 exceeds a reference voltage REF at a noninverting input terminal. Consequently, a transistor Q40 becomes nonconductive that enables positive voltage $V_7$ to be developed at the base of transistor Q2. Therefore, transistor Q2 begins conducting, as explained before and as shown in FIGS. $2_h$–$2j$. As explained later on, the length of the interval, $t_0$–$t_2$, of FIG. $2j$ when transistor Q2 of FIG. 1 is nonconductive increases when voltage $V_3$ decreases, and vice versa.

Diode D20 prevents the duty cycle of transistor Q2 from becoming higher than the duty cycle of transistor Q1, thus, advantageously, protecting transistor Q2. Without such protection, if, for example, level $V_{DC}$ of voltage $V_{120}$ of FIG. $2g$ were higher than voltage REF, transistor Q2 of FIG. 1 might have been destroyed.

Resistor R301 of network 81 permits gate voltage $V_7$ to become higher than the gate threshold voltage. When transistor Q30 becomes conducting, diode D10 by-passes resistor R301, causing a faster switch off time of transistor Q1.

At time $t_3$ of FIG. 2c, when horizontal flyback pulse $V_H$ occurs, transistor Q4 goes into saturation, short-circuiting winding W3 of transformer T1, as explained before. Thus, current $i_1$ of transformer T1 increases rapidly at time $t_3$ of FIG. 2d. The manner in which the increase in a current such as current $i_1$ occurs is explained in a copending U.S. Patent Application No. 270,877, filed Nov. 14, 1988, in the name of Applicant Leonardi, entitled A Switch Mode Power Supply and incorporated by reference herein.

At time $t_4$ of FIG. 2e, voltage $V_{11}$ becomes higher than $V_{111}$, triggering the oscillator that is formed by amplifiers U2 and U3, as explained before. Therefore, both transistor Q1 and Q2 are switched off and a new cycle begins.

Control circuit 120 of FIG. 1 that is referenced to the cold ground conductor controls the duty cycle of voltage $V_7$ at the base of transistor Q2 by varying control voltage $V_3$ across capacitor C3. A transistor Q5 of circuit 120 is coupled in a common base amplifier configuration. The base voltage of transistor Q5 may be obtained via a temperature compensated voltage $+12V$. A fixed value resistor R3 is coupled between the emitter of transistor Q5 and voltage B+. As a result of the common base operation, a current $i_8$ in resistor R3 is proportional to voltage B+. An adjustable resistor R4 that is used for adjusting the level of voltage B+ is coupled between the cold ground conductor and between the emitter of transistor Q5. Resistor R4 is used for adjusting the level of the current in transistor Q5. Thus, an adjustable, preset portion of current $i_8$ flows to the cold ground conductor through resistor R4 and an error component of current $i_8$ flows through the emitter of transistor Q5.

The collector current of transistor Q5 is coupled to the base of a transistor Q3 for controlling a collector current of transistor Q3. The collector of transistor Q3 forming a high output impedance is coupled to the junction between capacitor C3 and diode D3.

When transistor Q1 becomes nonconductive, the stored energy in transformer T1 causes a switching current to flow via diode D3 that charges capacitor C3, as indicated before. Regulation of the power supply is obtained by controlling control voltage $V_3$ in capacitor C3. Voltage $V_3$ is controlled by controlling the loading across winding W4 of transformer T1 by means of transistor Q3. When, for example, supply current loading across capacitor C66 decreases, voltage B+ tends to increase.

FIGS. 3a–3f illustrate waveforms useful for explaining the operation of the circuit in FIG. 1 when voltage B+ of FIG. 1 becomes higher than required such as after time $t_{40}$ of FIGS. 3a–3f. Similar symbols and numerals in FIGS. 1, 2a–2j and 3a–3f indicate similar items or functions.

Figure 3:
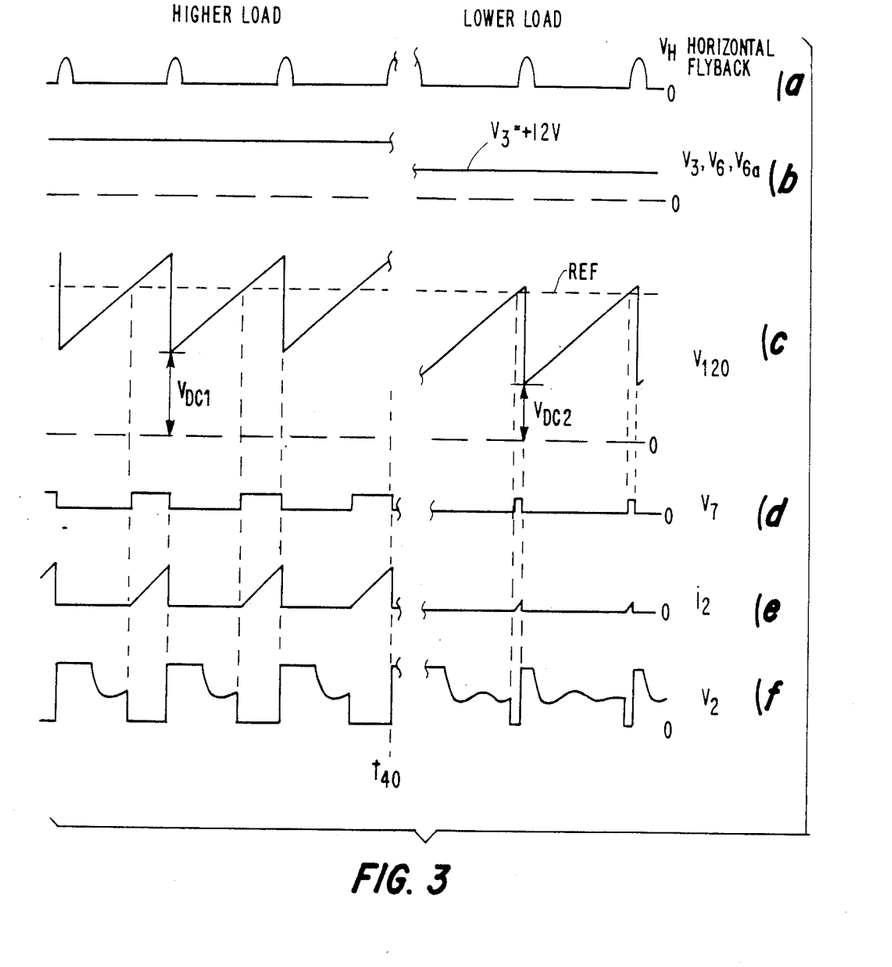
FIGS. 3a–3f illustrate additional waveforms useful for explaining the run mode operation of the circuit of FIG. 1 under a varying loading condition.

As a result of such transient excessive level of voltage B+ of FIG. 1, a higher base current flows in transistor Q3 via a resistor R3 and via a transistor Q5, causing voltage $V_3$ in capacitor C3 to become smaller. Hence, voltages $V_6$ and $V_{6a}$ that are produced as a result of voltage rectification during flyback operation in winding W2 of transformer T1 also become smaller. The result is that level $V_{DC}$ of voltage $V_{120}$ of FIG. 3c at a beginning time of a given upramping portion of voltage $V_{120}$ becomes smaller. Such decrease in level $V_{DC}$ of voltage $V_{120}$ is shown by the variation from level $V_{DC1}$ to level $V_{DC2}$ of FIG. 3c. Therefore, voltage $V_{120}$ of FIG. 1 exceeds voltage REF at a later instant in a given cycle, causing a reduction in the duty cycle of transistor Q2 of FIG. 1, as shown in FIGS. 3d–3f. The reduction in the duty cycle causes less energy to be stored in and transferred via transformer T2 of FIG. 1 to the load at a terminal where voltage B+ is developed. In this way, regulation of voltage B+ is obtained.

In steady state, voltage $V_3$ is stabilized at a level that causes an equilibrium between the charging and discharging currents of capacitor C3. An increase in voltage B+ from a nominal value is capable of causing, advantageously, a proportionally greater or amplified change in voltage $V_3$, as a result of amplification and current integration of the collector current in transistor Q3.

Processing voltage B+ for producing control voltage $V_3$ is accomplished, advantageously, in a DC coupled signal path for improving error sensing. A given proportional change in voltage B+ is capable of causing a greater proportional change in voltage $V_3$. Thus, error sensitivity is improved. Only after the error in voltage B+ is amplified, the amplified error contained in DC coupled voltage $V_3$ is transformer or AC coupled to winding W2. The combination of such features improves the regulation of voltage B+.

Another way by which an arrangement similar to control circuit 120 is used for regulation purposes is shown and explained in a copending U.S. Patent Application, Ser. No. 424,354, entitled A Switch-Mode Power Supply in the name of applicant Leonardi, filed concurrently herewith and incorporated by reference herein.

In accordance with another feature of the invention, transformer T1 couples both synchronizing signal $V_H$ and control voltage $V_3$ that is derived from voltage B+ across an isolation barrier. The coupling is done such that both signal $V_H$ and voltage B+ are isolated, with respect to an electrical shock hazard, from mains voltage $V_{AC}$.

Switching the television receiver into standby mode of operation is accomplished by turning off a transistor switch Q6. The collector of transistor switch Q6 is coupled in a current path that is formed by a series arrangement of a zener diode Z9.1, a resistor R60 and a diode D60. Such series arrangement is coupled between the collector and the base of transistor Q3.

When transistor Q6 is turned off, the negative feedback current flowing in zener diode Z9.1, resistor R60 and diode D60 to the base of transistor Q3 establishes voltage $V_3$ at approximately +12 volts that is lower than during normal operation. The result is that voltage $V_6$ is maintained at +15 volts and level $V_{DC}$ of voltage $V_{120}$ at the inverting input terminal of amplifier U4 is maintained at about +7 volts. Consequently, the peak voltage of sawtooth voltage $V_{120}$ cannot exceed voltage $V_{REF}$. Therefore, advantageously, transistor Q2 remains nonconductive throughout standby operation.

Throughout normal operation, voltage $V_{6a}$ produces a base current in a transistor Q7 via a zener diode Z18B. When conductive, transistor Q7 couples the anode of a diode D110 to the hot ground potential. Therefore, voltage $V_{11}$ at the cathode of diode D110 maintains diode D110 nonconductive.

The free running frequency of the oscillator that is formed by amplifiers U2 and U3 is designed to be lower than the horizontal frequency to allow for synchronization. Because voltage $V_6$ becomes lower during standby operation, transistor Q7 is turned off. Therefore, capacitor C11 is charged by an additional current that flows via a collector pull-up resistor R110 and diode D110. Consequently, the free running frequency of the oscillator, advantageously, increases beyond the audible range to prevent an audible nuisance.

During stand-by, voltage V+ that is used for energizing an infra red, remote control receiver, not shown, is supplied by voltage $V_3$ via a switch diode D200. On the other hand, during normal operation, diode D200 is back biased and voltage V+ is generated, instead, from a rectified voltage that is produced by transformer T2 and that is coupled via a switch diode D201. Because of the switching mode operation of transistor Q1, advantageously, low power losses occur during stand-by.

Switching the receiver into normal operation is accomplished by turning on transistor Q6. Thereby, voltages $V_3$, $V_6$ and the DC level $V_{DC}$ of voltage $V_{120}$ increase, thus enabling transistor Q2 to become conductive.

Figure 4:
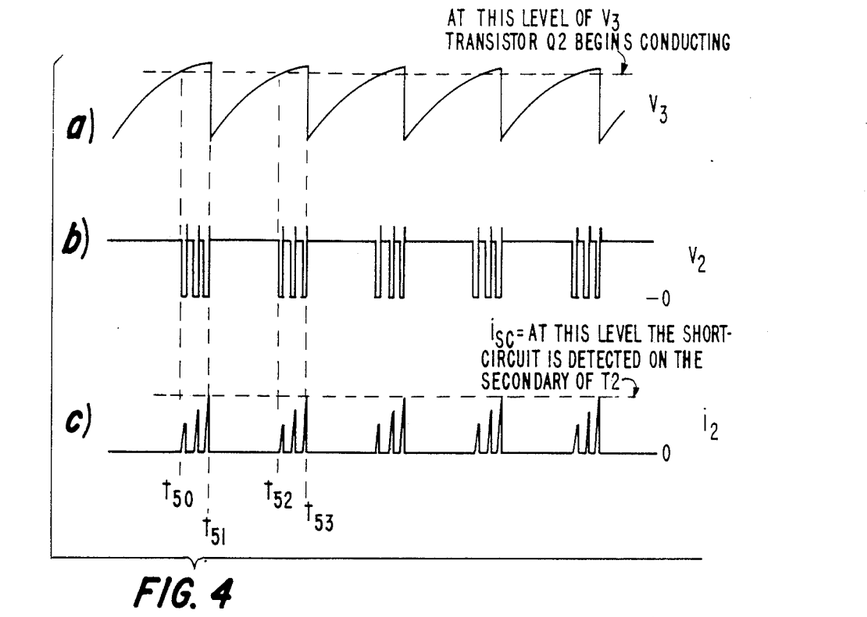
FIGS. 4a–4c illustrate waveforms of the circuit of FIG. 1 during an overload condition.

If a fault condition occurs, for example, when capacitor C66 becomes short circuited, SMPS 300 begins operation in an intermittent mode, for example, between times $t_{50}$ and $t_{51}$ of FIGS. 4a-4c followed by a relatively long dead time interval, $t_{51}$-$t_{52}$. Similar symbols and numerals in FIGS. 1 and in FIGS. 4a-4c that depict such fault condition indicate similar items or functions.

In case of such short circuit, a higher current $i_6$ flows through winding W6 of transformer T2 of FIG. 1, causing a higher negative voltage $V_{66}$ to be developed across a resistor R66 that is coupled between the low end of winding W6 and the cold ground. Thereby, for example, at time $t_{51}$ of FIGS. 4a-4c, diodes D62 and D63 of FIG. 1 that are coupled between the base of transistor Q6 and resistor R66 become conductive, transistor Q6 goes into cut-off, and transistor Q3 clamps voltage $V_3$ to about +12V. Consequently, as explained before with respect to the stand-by operation, transistor Q2 is switched off.

After time $t_{51}$ of FIGS. 4a-4c, transistor Q6 becomes conducting again and decouples zener diode Z9.1 and resistor R60 from the base of transistor Q3. Thereby, as shown in FIG. 4a, voltage $V_3$ increases slowly. Consequently, at time $t_{52}$, transistor Q2 of FIG. 1 conducts. However, due to the short-circuit on the secondary side of transformer T2, at time $t_{53}$ of FIG. 4c, transistor Q2 of FIG. 1 is switched off again, as explained before.

Immediately after the power or voltage $V_{AC}$ is applied, a capacitor C300 is charged during a portion of a period of voltage $V_{AC}$. Consequently, voltage $V_{UR}$ is developed in capacitor C300. Voltage $V_{UR}$ is coupled to capacitor C6 via a resistor R300 to charge capacitor C6, prior to normal operation.

An amplifier U1 has an inverting input terminal that is coupled to voltage $V_6$ and a noninverting input terminal that is coupled to voltage REF. After voltage $V_{AC}$ is initially applied, and after voltage $V_6$ in capacitor C6 becomes sufficiently large to exceed a predetermined minimum level that is determined by voltage REF, an output terminal of amplifier U1 is pulled down to the hot ground potential. The result is that a transistor switch Q8 is turned on into saturation and couples voltage $V_6$ to capacitor C6a. In this way, operation of SMPS 300 with a proper level of voltage $V_6$ properly begins.

Figure 5:
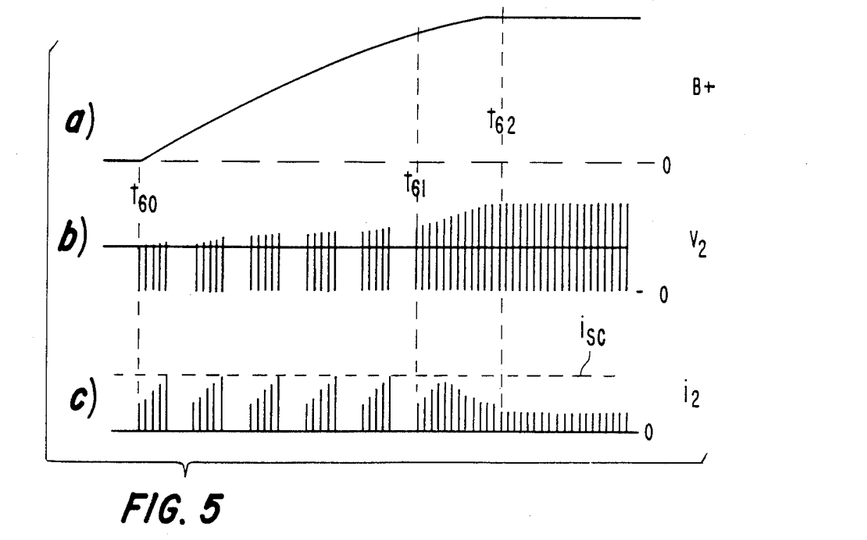
FIGS. 5a–5c illustrate a transient waveform useful for explaining the operation of the circuit of FIG. 1 during start-up.

FIGS. 5a-5c illustrate waveforms useful for explaining the aforementioned start-up operation in the circuit of FIG. 1 after voltage $V_{AC}$ of FIG. 1 is first applied. Similar symbols and numerals in FIGS. 1 and 5a-5c indicate similar items or functions.

At time $t_{60}$ of FIG. 5c, when voltage $V_6$ of FIG. 1 becomes sufficiently high, transistor Q2 begins also conducting. Capacitor C66 is in a discharged state, during the first interval $t_{60}$-$t_{61}$ of FIGS. 5a-5c. Therefore, SMPS 300 of FIG. 1 operates in an intermittent mode, as in the case of a secondary short-circuit that was explained before. However, the supplied energy slowly charges capacitor C66 of FIG. 1 on the secondary of transformer T2, thereby increasing voltage B+. At time $t_{61}$ of FIG. 5a, voltage B+ is high enough, so that transistor Q2 of FIG. 1 receives a proper base drive. The turn-on process is terminated when voltage B+ has reached its normal value, as shown in FIG. 5a at time $t_{62}$.

What is claimed is:

1. A synchronized switch mode power supply, comprising:
   a transformer having first and second windings;
   first switching means coupled to said first winding for generating a first switching current in said first winding to periodically energize said second winding;
   a source of a synchronizing input signal at a frequency that is related to a deflection frequency;
   second switching means responsive to said input signal and coupled to said second winding for periodically applying a low impedance across said energized second winding that by transformer action produces a substantial increase in said first switching current;
   means for generating a periodic first control signal;
   means responsive to said first switching current and coupled to said first control signal generating means for sensing said increase in said first switching current to synchronize said first control signal to said input signal;
   a source of an input supply voltage; and
   means responsive to said first control signal and coupled to said input supply voltage for generating from said input supply voltage an output supply voltage in accordance with said first control signal.

2. A power supply according to claim 1 further comprising, means responsive to said output supply voltage for generating a second control signal, in accordance with said output supply voltage, that is coupled to said first control signal generating means via said transformer for modulating said first control signal in accordance with said output supply voltage in a manner that regulates said output supply voltage.

3. A power supply according to claim 2 wherein said second control signal generating means comprises a capacitor and a rectifier coupled to a third winding of said transformer and to said capacitor, said rectifier rectifying a transformer coupled current that flows in said third winding to produce a rectified current that is coupled to said capacitor and that develops in said capacitor said second control signal.

4. A power supply according to claim 2 wherein said second control signal generating means is responsive to an on/off control signal for generating said second control signal at a predetermined level in capacitor during a standby operation when said output supply voltage is not generated to provide from a voltage that is developed in said capacitor a standby operating voltage during said standby operation.

5. A power supply according to claim 2 wherein said transformer isolates, with respect to an electrical shock hazard, each of said source of said input signal, said second control signal and said output supply voltage from said input supply voltage.

6. A power supply according to claim 1 wherein said first control signal synchronizing means comprises a current sampling, second impedance coupled in a current path that includes said first winding for conducting at least a portion of said first switching current in said second impedance to develop in said second impedance a current sampling signal such that after said low impedance is applied, said sampling signal is at a substantially higher magnitude, said current sampling signal being applied to said first control signal generating means for synchronizing said first control signal to said input signal.

7. A power supply according to claim 1 wherein said first winding is electrically nonisolated from said first switching means with respect to an electrical shock hazard and wherein said second winding is electrically isolated by said transformer from said first switching means.

8. A power supply according to claim 1 wherein said output supply voltage generating means comprises a power chopper switching transistor having a control terminal that is responsive to said first control signal and wherein said switching transistor is switched into nonconduction when said second switching means causes said first switching current to exceed a predetermined level.

9. A power supply according to claim 1 wherein said first control signal generating means comprises an oscillator that is synchronized in accordance with said input signal.

10. A power supply according to claim 9 wherein said oscillator is free running during a stand-by mode of operation.

11. A power supply according to claim 9 wherein said first winding of said transformer is coupled to a regenerative positive feedback signal path of said oscillator to effectuate synchronization of said oscillator.

12. A power supply according to claim 1 wherein said first winding and said first control signal are nonisolated with respect to an electrical shock hazard from said input supply voltage and wherein said transformer isolates with respect to the electrical shock hazard said second winding, said output supply voltage and said input signal from said input supply voltage.

13. A power supply according to claim 1 wherein said input signal is at the horizontal frequency.

14. A switch mode power supply, comprising:
a source of an input supply voltage;
means energized by said input supply voltage and responsive to a modulated control signal for generating from said input supply voltage an output supply voltage that is regulated in accordance with a timing modulation of said modulated control signal;
a transformer including first and second windings;
first switching means coupled to said first winding and operating at a given frequency for generating a first switching current in said first winding to energize said second winding;
a capacitor;
second switching means coupled to said second winding and to said capacitor for rectifying a current that flows in said second winding to generate therefrom a rectified current that flows in said capacitor to develop a first control voltage in said capacitor during a flyback interval, said capacitor being coupled via said second switching means to said second winding for applying said first control voltage to said second winding to produce in said second winding a second control voltage when said rectified current is generated;
means responsive to said output supply voltage and coupled to said capacitor for controlling said first control voltage such that a change in a magnitude of said output supply voltage from a nominal value thereof produces an amplified change in a magnitude of said second control voltage that is developed in said second winding;
means coupled to said transformer having said second control voltage transformer-coupled thereto via said transformer during said flyback interval when said rectified current is generated for rectifying said transformer-coupled second control voltage to generate a third control voltage at a level that is determined by said second control voltage;
a sawtooth signal generator responsive to said third control voltage for varying said sawtooth signal outside said flyback interval in accordance with said second control voltage; and
means responsive to said sawtooth signal for generating said modulated control signal with a timing modulation that varies in accordance with said first control voltage to regulate said output supply voltage.

15. A power supply according to claim 14 wherein said second switching means comprises a rectifier and wherein said first control voltage is coupled to said second winding via said rectifier during a portion of a given period when said rectifier is conductive.

16. A power supply according to claim 14 wherein said change in said output supply voltage is DC coupled from said output supply voltage to said second winding.

17. A power supply according to claim 14 wherein said second switching means comprises a diode that is forward biased by said transformer coupled current during a first portion of a given period to generate said rectified current that flows in said diode in the forward direction and in said capacitor.

18. A power supply according to claim 14 wherein said first control voltage controlling means comprises means for generating a second current in said capacitor such that both said rectified and second currents that are coupled to said capacitor are DC currents that flow in opposite directions in said capacitor.

19. A power supply according to claim 14 wherein said first control voltage controlling means comprises a transistor for generating a second current that varies in accordance with said output supply voltage and that flows in a main current conducting electrode thereof, said second current being coupled to said capacitor to flow therein in the opposite direction to said rectified current.

20. A power supply according to claim 19 wherein said second current generating means is responsive to a load current for providing an overcurrent protection.

21. A power supply according to claim 14 wherein said second switching means comprises a diode and wherein said current that flows in said second winding of said transformer forward biases said diode during said flyback interval of said first switching current to render said diode conductive.

22. A power supply according to claim 14 wherein said first control voltage controlling means comprises a transistor having an electrode forming a current source with a high output impedance that is coupled to said capacitor for discharging said capacitor at a rate of change that is determined in accordance with said output supply voltage to maintain said first control voltage in said capacitor at a level that is determined in accordance with said output supply voltage.

23. A power supply according to claim 14 wherein said transformer isolates said output supply voltage from said first control signal with respect to an electrical shock hazard.

24. A power supply according to claim 14 further comprising, a source of a synchronizing input signal at a frequency that is related to a deflection frequency, third switching means responsive to said input signal and coupled to said second winding for periodically applying a low impedance across said energized second winding, said applied low impedance causing, by a transformer action, a substantial increase in said first switching current, and means responsive to said first switching current and coupled to said modulated control signal generating means for sensing said increase in said first switching current to synchronize said modulated control signal to said input signal when said increase in said first switching current occurs, in accordance with said input signal.

* * * * *